United States Patent [19]

Keches et al.

[11] 4,323,247

[45] Apr. 6, 1982

[54] GOLF BALL COVER

[75] Inventors: Leonidas A. Keches, New Bedford; Sharon R. Goggin, Acushnet; Edward J. Isaac, Westport; Ronald J. Rogers, New Bedford, all of Mass.

[73] Assignee: Acushnet Company, New Bedford, Mass.

[21] Appl. No.: 226,170

[22] Filed: Jan. 19, 1981

[51] Int. Cl.$^3$ .............................................. A63B 37/12
[52] U.S. Cl. .......................... 273/235 R; 260/998.14; 525/221
[58] Field of Search .................. 260/998.14; 525/221; 273/235 R

[56] References Cited

U.S. PATENT DOCUMENTS

| | | | |
|---|---|---|---|
| 3,819,768 | 6/1974 | Molitor | 273/235 R |
| 3,940,146 | 2/1976 | Little | 260/998.14 |
| 4,169,599 | 10/1979 | Fujio et al. | 260/998.14 |
| 4,264,075 | 4/1981 | Miller et al. | 260/998.14 |

*Primary Examiner*—Allan Lieberman
*Attorney, Agent, or Firm*—Eyre, Mann, Lucas & Just

[57] ABSTRACT

An improved cover for golf balls is disclosed. The cover imparts to the ball both a high initial velocity and exceptional durability. The cover is composed of at least three ionomeric resins. The invention is particularly useful with so-called two-piece golf balls, especially those which are compression molded.

10 Claims, No Drawings

GOLF BALL COVER

The present invention relates to golf balls and, more particularly, to covers for golf balls.

Down through the years, it has been rather standard practice in the golfing industry to supply a cover about a golf ball core. The golf ball core is typically 1.4–1.6 inches in diameter and the cover is of sufficient thickness to end up with a golf ball having the minimum USGA specified diameter of 1.68 inches. With the smaller size British golf ball having a minimum diameter of 1.62 inches, the core size is typically 1.35–1.55 inches.

Until the late 1960's, this cover was used about a so-called wound core. The wound core comprised a center and a long thin elastic band wrapped tightly thereabout. In the late 1960's, there were found compositions which could replace the wound cores. It was originally thought that these materials could replace both the core and the cover thus enabling the production of a unitary, homogenous golf ball. However, the unitary golf balls have not been found to be of sufficiently high quality for play by most golfers. While some unitary golf balls are played by some golfers and quite a great number are used as practice balls in driving ranges and the like, the consensus of opinion today is that a high grade golf ball should consist of a unitary solid core of approximately the dimensions of a wound core together with a cover thereon.

With respect to golf ball cover materials, balata was pretty much the standard of the industry until about the middle 1960's when DuPont discovered a new series of resins, now known as ionomers, see U.S. Pat. No. 3,264,272. These ionomeric resins have been found to be quite good as golf ball cover materials, see U.S. Pat. No. 3,454,280. While balata is still used to a considerable extent, the ionomeric resins have dominated the golf ball cover market and have replaced the balata covers except for the really exceptional golfers and those who emulate them. The reason that these ionomeric resins have been so successful is because of their considerably improved cut resistance as compared to balata, their substantially cheaper price and their ready availability. In connection with the latter it is pointed out that balata is a natural resin imported from foreign countries and its availability, at best, is erratic and prices fluctuate accordingly. The ionomeric resins are sold by E. I. DuPont de Nemours & Co. under the trademark Surlyn. While the '272 patent mentioned hereinbefore teaches a wide variety of compounds within the purview of the patent, in actual fact only a relatively few resins are available commercially. The ionomeric resins are copolymers of an olefin and an $\alpha,\beta$ ethylenically unsaturated carboxylic acids with 10–90% of the carboxylic acid groups being neutralized by metal ions. While a great number of compounds are embraced within the patent, the only resins available in commercial quantities are copolymers of ethylene with methacrylic acid and with the acid groups neutralized by sodium or zinc ions. Within this narrow spectrum, however, there are quite a number of resins available, the resins differing primarily in the quantities of the three ingredients (ethylene, unsaturated acid, and metal ions) present.

When making golf ball covers, the Surlyn resins can be used individually or they can be blended together. U.S. Pat. No. 3,819,768 claims that a blend of a sodium salt of an ionomer resin with a zinc salt of an ionomer resin will give improved cold cracking properties, and an improved coefficient of restitution and superior durability. This patent is owned by Questor Corp., manufacturer of golf balls sold under the trademark TopFlite. While the Questor patent claims that all commercially available blends of ionomer resins with different metal ions, i.e. all blends of zinc ionomer resins and sodium ionomer resins, will have the improved coefficient of restitution, it has been found that most blends of these two resins, other than the Surlyn 1555 and Surlyn 1557 as specifically set forth in the Questor patent, do not have an improved coefficient of restitution. It has also been discovered that these blends are generally cut when subjected to the so-called guillotine test.

The Applicants have now discovered a triblend of ionomer resins for golf ball covers which has surprisingly high durability coupled with excellent initial velocity. In accordance with the Applicant's invention, the blend comprises Surlyn 1707, Surlyn 1706 and Surlyn 1702. The Surlyn 1707 is present in the blend in an amount of from about 35% to about 60% by weight of the blend. The Surlyn 1706 is also present in an amount of from about 15% to about 50% by weight of the blend. The Surlyn 1702 is present in an amount of from about 5% to about 35% by weight of the blend.

Surlyn 1707 is a copolymer of ethylene with methacrylic acid with about 34.8% free acid, and about 2.1% sodium ions. This resin has an average melt flow index of about 0.9. Both Surlyn 1702 and Surlyn 1706 are copolymers of ethylene and methacrylic acid and the metal present is zinc. In Surlyn 1702 there is about 96.5% free acid and about 1.2% zinc. In Surlyn 1706 there is about 48.9% free acid and about 1.8% zinc. The average melt flow index of Surlyn 1706 is about 0.7 while the average melt flow index of Surlyn 1702 is about 14. When speaking of melt flow index herein, it is determined according to ASTM Test D1238, Condition E.

In the preferred embodiment of the applicant's invention, the cover is applied by compression molding. When compression molding, the combination of all of the ionomer resins is preferably selected to yield a blend having a melt flow index between 1.0 and 3.0.

It has been found that an excellent golf ball cover can be formed utilizing 40% Surlyn 1707, 45% Surlyn 1706 and 15% Surlyn 1702. This blend has a melt flow index of about 1.3.

The Surlyn triblend as hereinbefore described makes up at least about 90% of the golf ball cover and preferably at least 95%. Additional materials which may be included in the golf ball cover include other Surlyn resins, titanium dioxide, dyes, UV absorbers, and other known additives. In accordance with the preferred embodiment of the present invention, the triblend cover is compression molded about the core. This is as distinguished from most, if not all, two-piece golf balls on the market today in which the cover is injection molded about the core.

In compression molding, golf ball half shells are first formed. These are formed by injection molding. With the preferred triblend of the present invention as set forth hereinbefore, it has been found that injection molding at 480° F. for 55 seconds makes good half shells.

The half shells are then placed about the core and the assembly is introduced into a compression molding machine. The compression molding machine is a hydraulic press having upper and lower plates. Each plate has a series of golf ball half molds therein, the opposed half molds being in registration to make the spherical golf balls. It has been found that half shells made with the preferred triblend of the present invention can be suitably compression molded at 300° F. for 3 minutes 15 seconds. While still in the mold, the balls are cooled by the introduction of chilled water. It has been found that 40° water circulated for 3 minutes 45 seconds will reduce the temperature of the balls to about 70° F., which has been found to be suitable for use in the present invention.

After the balls are compression molded they go through various known further steps such as buffing the flash line, painting, namestamping etc. The balls are then permitted to stabilize at room temperature for at least one week before they are used, primarily to let the paint harden.

The invention is illustrated by the following examples.

EXAMPLE 1

A golf ball core was prepared in standard manner utilizing polybutadiene and zinc dimethacrylate as disclosed in British Pat. No. 1,364,138 of Sept. 8, 1972, the same being incorporated herein by reference. The core had a diameter of 1.50 inches. About this core was compression molded a cover according to the present invention. The cover was made of 40% Surlyn 1707, 45% Surlyn 1706 and 15% Surlyn 1702. 100 parts of this blend were combined with 5 parts by weight of a pigmenting composition comprising 40 parts by weight titanium dioxide, 0.024 parts of thalocyanine blue, 0.025 parts cadmium yellow and 60 parts of Surlyn 1559 ionomer resin as an assimilation aid. The cover stock had a melt flow index of 1.4. It was formed into golf ball half shells by injection molding at 480° F. The golf ball half shells were then compression molded about the cores at 300° for 3 minutes 15 seconds yielding a golf ball with a diameter of 1.68 inches, i.e. a nominal cover thickness of 0.09 inches. The balls were then coated with an epoxy primer and a finish coat of polyurethane. In accordance with standard processing techniques, the balls were then permitted to age for two weeks.

The balls as thus prepared were compared to commercially purchased TopFlite golf balls. The TopFlite golf balls have a similar core and have a cover which is a blend of a zinc Surlyn resin and a sodium Surlyn resin.

The balls were compared as to cutting resistance by using a guillotine test. In the guillotine test, a knife edge of a specific weight is impacted against the golf ball from a specified height under the force of gravity. Cut resistance is determined according to the number of cuts which the ball suffers, a cut being defined as penetration completely through the cover. A mere crease in the golf ball is not considered to be a cut for testing purposes. In the instant case, the guillotine blade weighed 8 pounds, was dropped from a height of 32 inches and had a blade tip surface of approximately 5/16 inches rounded on both corners, which simulates the leading edge of iron type golf clubs.

In the guillotine test, the TopFlite golf balls suffered cuts in 43 out of 48 instances while golf balls having the cover of the present invention had only 1 cut out of 48.

The golf balls according to the present invention and the TopFlite golf balls were also tested for initial velocity. Under United States Golf Association rules, the maximum initial velocity which a golf ball can have is 255 feet per second (250 feet per second with maximum 2% error). The TopFlite golf balls had an initial velocity of about 250.8 feet per second while the golf balls according to the present invention had an initial velocity of about 251.0 feet per second. It is thus seen that golf balls according to the present invention had very surprisingly higher cut resistance with no loss in initial velocity.

EXAMPLE 2

Example 1 was repeated except that Surlyn 1652 was used in place of the Surlyn 1702. Surlyn 1652 is a zinc ionomer resin of ethylene and methacrylic acid with 92.9% free acid and 0.6% zinc. When these golf balls were tested for cut resistance, the cut resistance was comparable to the cut resistance of the golf balls of the present invention made according to Example 1. However, it was also noted that the initial velocity of the golf ball dropped by about 0.4 feet per second. A difference of 1 foot per second in initial velocity is generally considered to equate to about 1½ yards on a drive of 225 yards.

EXAMPLE 3

In order to confirm the improved cut resistance of the covers according to the present invention as compared to the TopFlite golf ball, a series of golf balls were prepared using cores of commercially available TopFlite golf balls. The covers on the TopFlite golf balls were carefully removed and the cores were found to have a diameter of 1.5 inches. To these cores were molded covers in the same manner as set forth in Example 1. The balls thus formed were then compared to TopFlite golf balls (purchased at the same time) for cut resistance. In this case, the 8 pound blade of the guillotine was dropped 30 inches. The TopFlite golf balls suffered 20 cuts out of 24 instances (83% cutting) while golf balls made with the TopFlite cores but with the cover of the present invention suffered only 6 cuts out of 48 instances (12.5%).

EXAMPLE 4

Example 1 is again repeated except that in this instance standard wound cores are utilized rather than utilizing a solid core. The wound cores selected have a polybutadiene center of about 1.06 inches with a band of elastic tightly wrapped thereabout to yield a core of about 1.5 inches.

When tested in the guillotine test, the balls do very well as compared to other commercially available golf balls having Surlyn resin covers. However, they do not perform as well as golf balls according to the present invention with a solid core.

It will be understood that the claims are intended to cover all changes and modifications of the preferred embodiments of the invention, herein chosen for the purpose of illustration, which do not constitute departures from the spirit and scope of the invention.

What is claimed is:

1. In a golf ball comprising a core and a cover, the improvement comprising at least about 90% of said cover being composed of a triblend as follows:
    (a) a first ionomer resin which is a copolymer of ethylene with methacrylic acid and having 34.8% free acid, about 9.5% total acid, about 2.1% sodium ions and an average melt flow index of about 0.9, said first resin being present in an amount of about 35% to about 60% by weight of the triblend;
    (b) a second ionomer resin which is a copolymer of ethylene with methacrylic acid with about 48.9% free acid, about 1.8% zinc and an average melt flow index of about 0.7, said second resin being present in an amount of from about 15% to about 50% by weight of the triblend; and (c) a third ionomer resin which is a copolymer of ethylene with methacrylic acid having about 96.5% free acid, about 1.2% zinc and an average melt flow index of about 14, said third resin being present in the amount of from about 5% to about 35% by weight of the triblend.

2. The golf ball of claim 1 wherein the quantities of the 3 resins are selected to yield a triblend having a melt index between about 1.0 and about 3.0.

3. The golf ball of claim 1 wherein there is about 40% of the first resin, 45% of the second resin and 15% of the third resin.

4. The golf ball of claim 1 wherein the core is a unitary mass.

5. The golf ball of claim 4 wherein the core has a diameter of about 1.5 inches.

6. The golf ball of claim 5 wherein the diameter of the golf ball is at least 1.68 inches.

7. The golf ball of claim 1 wherein the diameter of the golf ball is at least 1.62 inches.

8. The golf ball of claim 1 wherein the cover is compression molded about the core.

9. The golf ball of claim 1 wherein at least about 95% of the cover is composed of the triblend.

10. The golf ball of claim 1 wherein the cover comprises, in combination, up to 10% by weight of one or more additional ingredients selected from the group consisting of other ionomer resins, titanium dioxide, dyes, and UV absorbers.

* * * * *